United States Patent
Kund

(10) Patent No.: US 7,997,791 B2
(45) Date of Patent: Aug. 16, 2011

(54) TEMPERATURE SENSOR, INTEGRATED CIRCUIT, MEMORY MODULE, AND METHOD OF COLLECTING TEMPERATURE TREATMENT DATA

(75) Inventor: Michael Kund, Tuntenhausen (DE)

(73) Assignee: Qimonda AG, Munich (DE)

( * ) Notice: Subject to any disclaimer, the term of this patent is extended or adjusted under 35 U.S.C. 154(b) by 214 days.

(21) Appl. No.: 11/782,532

(22) Filed: Jul. 24, 2007

(65) Prior Publication Data
US 2009/0028213 A1 Jan. 29, 2009

(51) Int. Cl.
*G01K 3/00* (2006.01)
*G01K 7/00* (2006.01)

(52) U.S. Cl. ......... 374/103; 374/102; 374/183; 374/185

(58) Field of Classification Search ............. 374/E3.004, 374/E7.022, 102, 103, 185, 183, E15.001
See application file for complete search history.

(56) References Cited

U.S. PATENT DOCUMENTS

| | | | | |
|---|---|---|---|---|
| 5,473,304 | A * | 12/1995 | Friese et al. | 338/23 |
| 5,823,680 | A * | 10/1998 | Kato et al. | 374/185 |
| 5,975,758 | A | 11/1999 | Yokota et al. | |
| 6,974,249 | B1 * | 12/2005 | Fair et al. | 374/102 |
| 7,460,394 | B2 * | 12/2008 | Happ et al. | 365/163 |
| 7,623,401 | B2 * | 11/2009 | Philipp et al. | 365/222 |
| 2004/0194535 | A1 | 10/2004 | Su et al. | |
| 2005/0285095 | A1 | 12/2005 | Happ | |
| 2005/0286211 | A1 * | 12/2005 | Pinnow et al. | 361/523 |
| 2006/0250856 | A1 * | 11/2006 | Bertin et al. | 365/189.01 |
| 2007/0280023 | A1 * | 12/2007 | Happ et al. | 365/222 |
| 2007/0297221 | A1 * | 12/2007 | Philipp et al. | 365/163 |
| 2008/0017842 | A1 * | 1/2008 | Happ et al. | 257/4 |
| 2008/0187021 | A1 * | 8/2008 | Haarer et al. | 374/102 |

FOREIGN PATENT DOCUMENTS

| | | |
|---|---|---|
| DE | 10 2004 031 135 A1 | 1/2006 |
| DE | 10 2005 031 604 A1 | 1/2007 |
| EP | 1 306 348 A1 | 5/2003 |
| WO | 10-2005001460 A2 | 1/2005 |

OTHER PUBLICATIONS

"Arrhenius equation." Encyclopædia Britannica. 2010. Encyclopædia Britannica Online. Feb. 27, 2010 <http://www.britannica.com/EBchecked/topic/36095/Arrhenius-equation>.*

Bychkov, E., et al., "Percolation transition in Ag-doped germanium chalcogenide-based glasses: conductivity and silver diffusion results," Journal of Non-Crystalline Solids 208, 1996, pp. 1-20.

* cited by examiner

*Primary Examiner* — Lisa M Caputo
*Assistant Examiner* — Jonathan Dunlap

(57) ABSTRACT

According to one embodiment of the present invention, a temperature sensor is provided, including a first electrode, a second electrode, a nanoporous material disposed between the first electrode and the second electrode, and a diffusion material which is located outside the nanoporous material that is capable of diffusion into the nanoporous material. The amount of diffusion material diffusing into the nanoporous material is dependent on the temperature to which the temperature sensor is exposed. The resistance of the nanoporous material is dependent on the amount of diffusion material diffusing into the nanoporous material.

17 Claims, 6 Drawing Sheets

Subjecting a composite structure comprising a nanoporous material layer and a diffusion material layer disposed on or above the nanoporous material layer to a temperature treatment such that diffusion material diffuses out of the diffusion material layer into the nanoporous material layer

501

Determining the amount of diffusion material diffused into the nanoporous material layer

502

Determining temperature treatment data in dependence on the amount of diffusion material determined

503

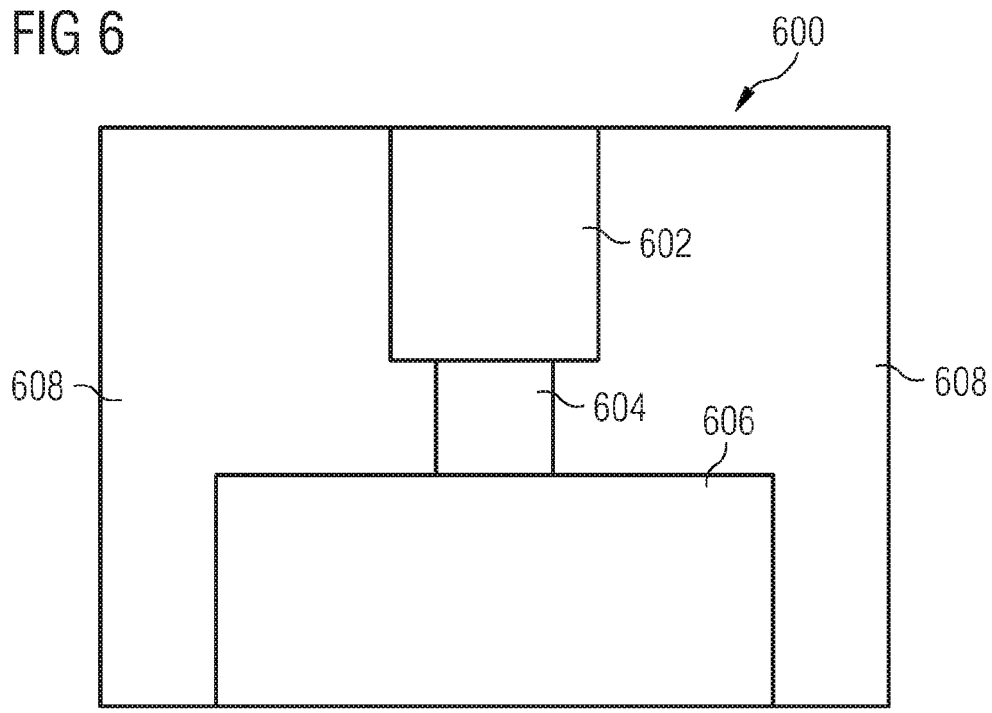

FIG 6

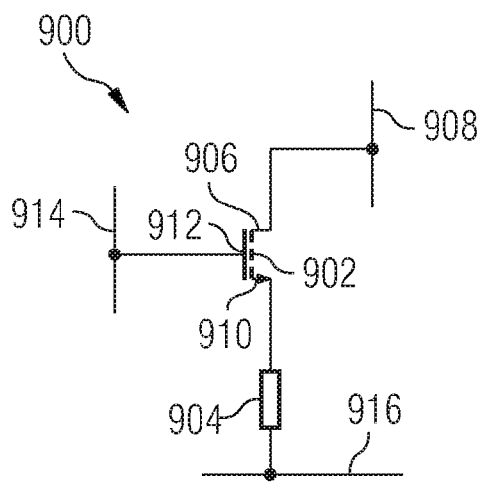
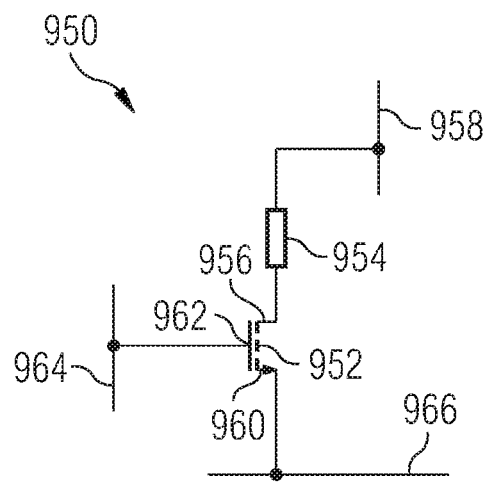
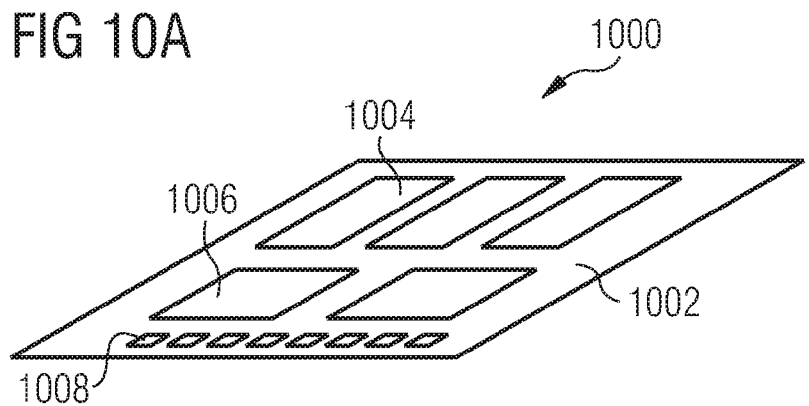
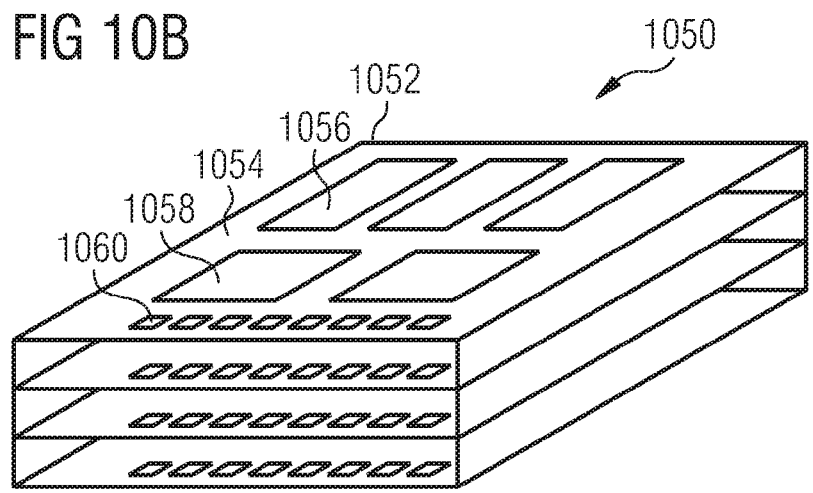

TEMPERATURE SENSOR, INTEGRATED CIRCUIT, MEMORY MODULE, AND METHOD OF COLLECTING TEMPERATURE TREATMENT DATA

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 5 shows a flow chart of a method of collecting temperature treatment data according to one embodiment of the present invention;

FIG. 6 shows a schematic cross-sectional view of a phase changing memory cell;

FIG. 9a shows a part of an integrated circuit including resistivity changing memory cells;

FIG. 9b shows a part of an integrated circuit including resistivity changing memory cells;

FIG. 10a shows a schematic drawing of a memory module according to one embodiment of the present invention;

FIG. 10b shows a schematic drawing of a memory module according to one embodiment of the present invention;

DETAILED DESCRIPTION OF ILLUSTRATIVE EMBODIMENTS

Figure 1:
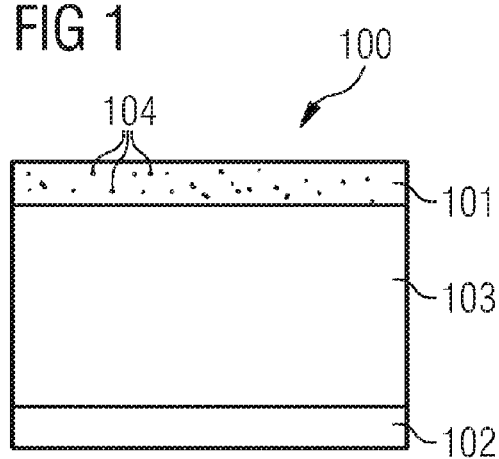
FIG. 1 shows a temperature sensor according to one embodiment of the present invention.

FIG. 1 shows a temperature sensor 100 including a first electrode 101, a second electrode 102, and nanoporous material 103 disposed between the first electrode 101 and the second electrode 102. The temperature sensor 100 further includes diffusion material 104 which is located outside the nanoporous material 103. Here, the diffusion material 104 is located within the first electrode 101. However, an embodiment of the invention is not restricted thereto. The diffusion material 104 may also be located within the second electrode 102, between the first electrode 101 and the nanoporous material 103 (e.g., within a material layer disposed between the first electrode 101 and the nanoporous material 103), or between the second electrode 102 and the nanoporous material 103 (e.g., within a material layer disposed between the second electrode 102 and the nanoporous material 103). The temperature sensor 100 is arranged such that the amount of diffusion material 104 diffusing into the nanoporous material 103 is dependent on the temperature to which the temperature sensor 100 is exposed. Further, the temperature sensor 100 is arranged such that the resistance of the nanoporous material is dependent on the amount of diffusion material 104 diffusing into the nanoporous material.

According to one embodiment of the present invention, the amount of diffusion material 104 diffusing into the nanoporous material 103 depends on the temperature value of a temperature treatment to which the temperature sensor 100 is subjected.

According to one embodiment of the present invention, the temperature sensor 100 is arranged such that the amount of diffusion material 104 diffusing into the nanoporous material 103 depends on the duration of a temperature treatment to which the temperature sensor 100 is subjected.

According to one embodiment of the present invention, the temperature sensor 100 is arranged such that the amount of diffusion material 104 diffusing into the nanoporous material 103 is proportional to the accumulative temperature budget applied to the temperature sensor 100.

According to one embodiment of the present invention, the first electrode 101 is a reactive electrode, and the second electrode 102 is an inert electrode.

According to an embodiment of the present invention, the diffusion material 104 is located within the reactive electrode.

According to one embodiment of the present invention, the diffusion material 104 includes or consists of conductive material, and the nanoporous material 103 includes or consists of insulating material. However, the present invention is not restricted thereto.

According to one embodiment of the present invention, the nanoporous material 103 includes or consists of chalcogenide glass.

According to one embodiment of the present invention, the nanoporous material 103 includes or consists of dielectric material.

According to one embodiment of the present invention, the nanoporous material 103 includes or consists of carbon-doped $SiO_2$.

According to one embodiment of the present invention, the reactive electrode includes or consists of metal having a high diffusion coefficient. In this case, the diffusion material 104 and the reactive electrode material may be identical materials.

According to one embodiment of the present invention, the reactive electrode includes or consists of silver, copper or aluminum.

According to one embodiment of the present invention, the inert electrode includes or consists of gold, tungsten, titanium, titanium nitride, platinum, tantalum, tantalum nitride, or carbon.

FIG. 1 shows the case where the nanoporous material 103 is arranged as a nanoporous material layer, the first electrode 101 including the diffusion material 104 is arranged as an electrode layer, and the second electrode 102 is arranged as an electrode layer. However, the present invention is not restricted thereto.

Where the nanoporous material 103, the first electrode 101, and the second electrode 102 are arranged as layers, respectively, the nanoporous material layer may have the same lateral dimensions as that of the first electrode layer.

Figure 3:
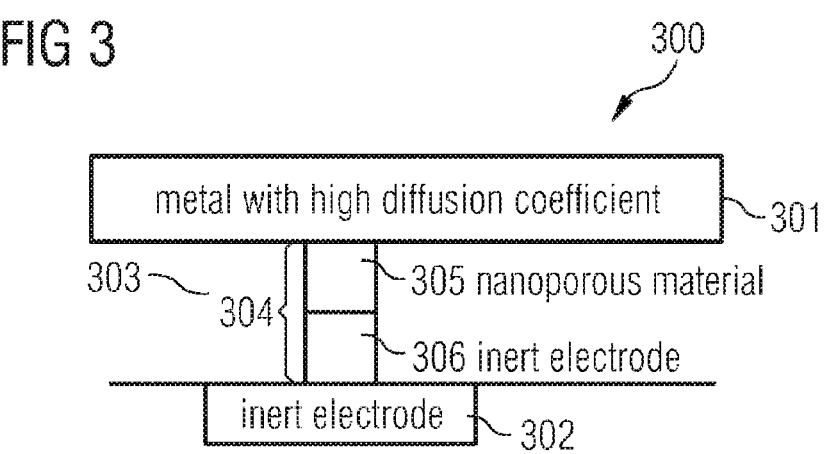
FIG. 3 shows a schematic cross-sectional view of a temperature sensor according to one embodiment of the present invention.

Alternatively, according to one embodiment of the present invention, the nanoporous material 103 is disposed in a plug formed within an isolation layer, wherein the isolation layer is disposed between the first electrode layer 101 and the second electrode layer 102, and wherein the plug connects the first electrode layer 101 with the second electrode layer 102. An example of such an embodiment is shown in FIG. 3:

FIG. 3 shows a temperature sensor 300 including a first electrode layer 301, a second electrode layer 302, and an isolation layer 303 disposed between the first electrode layer 301 and the second electrode layer 302. The isolation layer 303 includes a plug 304 which is filled with nanoporous material 305 (upper part of the plug 304) and with conductive material 306 (lower part of the plug 304). The plug 304 connects the first electrode layer 301 with the second electrode layer 302. The conductive material 306 may be interpreted as part of the second electrode layer 302. The first electrode layer 301 includes or consists of material having a high diffusion coefficient. As can be derived from FIG. 3, the lateral dimensions of the plug 304 differ from the lateral dimensions of the first electrode layer 301. That is, the lateral dimensions of the plug 304 are smaller than the lateral dimensions of the first electrode layer 301, i.e., the lateral dimensions of the first electrode layer differ from the lateral dimensions of the nanoporous material 305.

Figure 4:
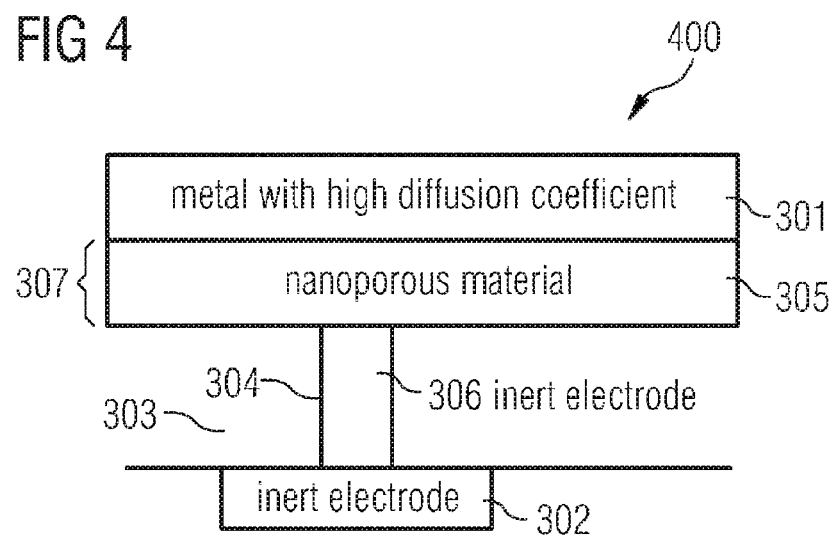
FIG. 4 shows a schematic cross-sectional view of a temperature sensor according to one embodiment of the present invention.

In contrast, as shown in FIG. 4, the upper part of the isolation layer including the upper part of the plug 304 is replaced by a nanoporous material layer 307 having the same lateral dimensions as that of the first electrode layer 301. Compared to the temperature sensor 300, the temperature sensor 400 is easier to manufacture since the nanoporous material 307 does not have to be introduced into a via as is necessary when manufacturing the temperature sensor 300. However, the temperature sensor 400 may result in higher cross talk between the temperature sensor 400 and areas (e.g., memory cells) surrounding the temperature sensor 400 due to the large lateral extent of the nanoporous material layer 307. Since the nanoporous material 305 has a relatively small lateral extent, only little cross talk between the temperature sensor 300 and areas (e.g., memory cells) surrounding the temperature sensor 300 occurs.

Figure 2A:
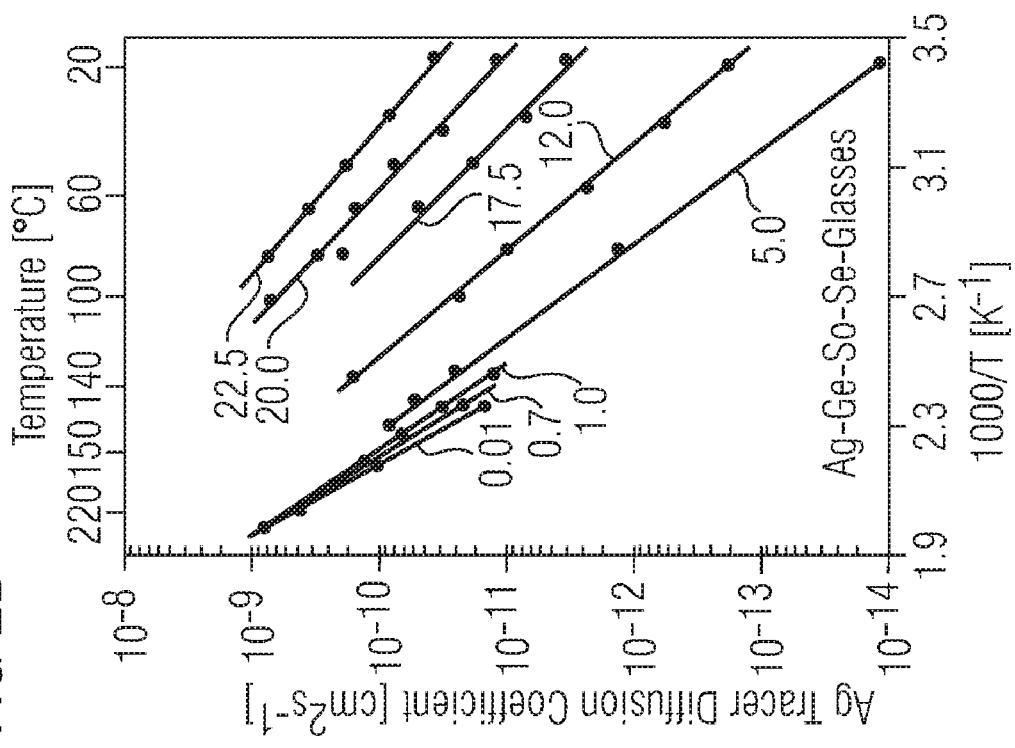
FIG. 2a shows the diffusion coefficient of silver over the temperature within a first material.
Figure 2B:
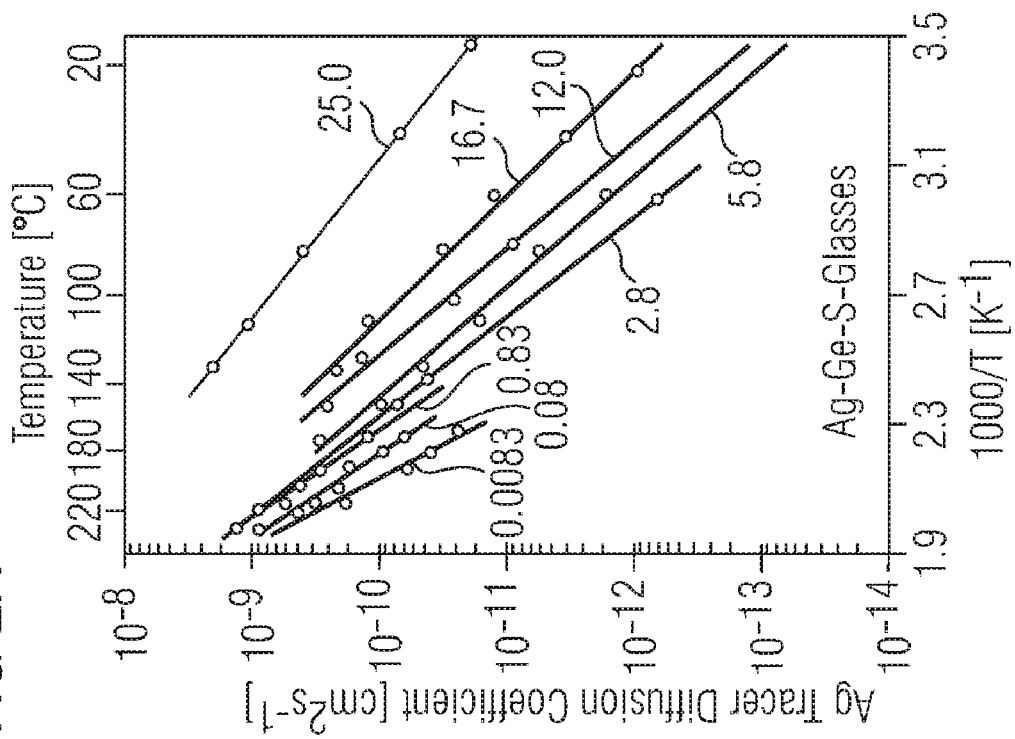
FIG. 2b shows the diffusion coefficient of silver over the temperature within a second material.

FIG. 2*a* shows the diffusion coefficient of silver within Ag—Ge—S glasses (nanoporous material), wherein FIG. 2*b* shows the diffusion coefficient of silver within Ag—Ge—Sd-Se glasses (nanoporous material). The following can be derived from FIGS. 2*a* and 2*b*: the higher the temperature, the higher the diffusion coefficient is. Referring to FIGS. 3 and 4, this means: the higher the temperature of a temperature treatment to which the temperature sensors 100, 300, 400 are subjected, the higher the diffusion coefficient of the diffusion material included within the first electrode layer 301 becomes, and, as a consequence, the more diffusion material diffuses from the first electrode layer 301 into the nanoporous material 305. The amount of diffusion material which has been diffused into the nanoporous material 305 is proportional to the accumulative temperature to which the temperature sensors 300, 400 had been subjected.

An embodiment of the present invention further provides an integrated circuit including a temperature sensor, wherein the temperature sensor includes: a first electrode, a second electrode, nanoporous material disposed between the first electrode and the second electrode, and diffusion material which is located outside the nanoporous material and which is capable of diffusing into the nanoporous material. The amount of diffusion material diffusing into the nanoporous material is dependent on the temperature to which the temperature sensor is exposed. The resistance of the nanoporous material is dependent on the amount of diffusion material diffusing into the nanoporous material.

All embodiments of the temperature sensor described in the foregoing description may also be applied to the integrated circuits described herein.

The integrated circuit may be an arbitrary integrated circuit. For example, according to one embodiment of the present invention, the integrated circuit includes resistivity changing memory cells. According to one embodiment of the present invention, the resistivity changing memory cells are programmable metallization memory cells (e.g., CBRAM cells), phase changing memory cells (e.g., PCRAM cells), carbon memory cells, or magneto-resistive memory cells (e.g., MRAM cells). Since the temperature sensor may show an architecture which is similar to that of a resistivity changing memory cell (see, for example, FIGS. 3 and 4), the temperature sensor may be manufactured together with resistivity changing memory cells, i.e., no or only a few extra processes are necessary to manufacture the temperature sensor. According to one embodiment of the present invention, the integrated circuit includes a plurality of temperature sensors spread over the integrated circuit in order to determine the temperature of different parts of the integrated circuit.

An embodiment of the present invention further provides a memory module including at least one integrated circuit including a temperature sensor, wherein the temperature sensor includes: a first electrode, a second electrode, nanoporous material disposed between the first electrode and the second electrode, and diffusion material located outside the nanoporous material. The amount of diffusion material diffusing into the nanoporous material is dependent on the temperature to which the temperature sensor is exposed. The resistance of the nanoporous material is dependent on the amount of diffusion material diffusing into the nanoporous material.

According to one embodiment of the present invention, the memory module is stackable.

FIG. 5 shows a method 500 of collecting temperature treatment data according to one embodiment of the present invention.

At 501, a composite structure including a nanoporous material layer and a diffusion material layer disposed on or above the nanoporous material layer is subjected to a temperature treatment such that diffusion material diffuses out of the diffusion material layer into the nanoporous material layer.

At 502, the amount of diffusion material diffused into the nanoporous material is determined.

At 503, temperature treatment data is determined based on the amount of diffusion material determined in 502.

According to one embodiment of the present invention, the temperature treatment data includes accumulative temperature data indicating the course of temperature to which the composite structure had been subjected.

According to one embodiment of the present invention, the temperature treatment data is determined in dependence on the strength of a resistance change of the nanoporous material caused by a concentration change of the diffusion material within the nanoporous material.

According to one embodiment of the present invention, the temperature sensor can be reset to an initial state by applying corresponding voltages/currents to the temperature sensor. The temperature sensor may, for example, be reset using a voltage of 300 mV and a current of 10 $\mu$A to 50 $\mu$A (using a current limiter) over a long period of time (quasi statically); alternatively, the temperature sensor may be reset using a voltage pulse of 1.5 V over a short period of time like 50 ns (dynamically).

Since the embodiments of the present invention can be applied to integrated circuits including programmable metallization cells (PMC) (e.g., solid electrolyte devices like CBRAM (conductive bridging random access memory) devices), in the following description, making reference to FIGS. 11A and 11B, a basic principle underlying embodiments of CBRAM devices will be explained.

Figure 11A:
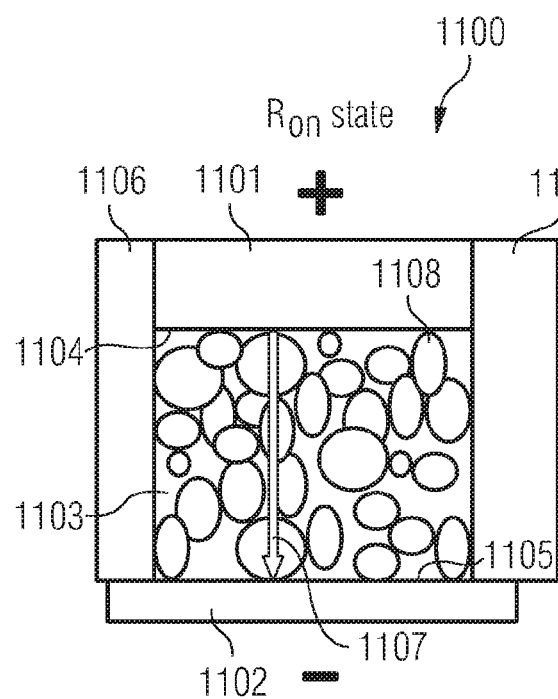
FIG. 11a shows a schematic cross-sectional view of a conductive bridging memory cell set to a first switching state.
Figure 11B:
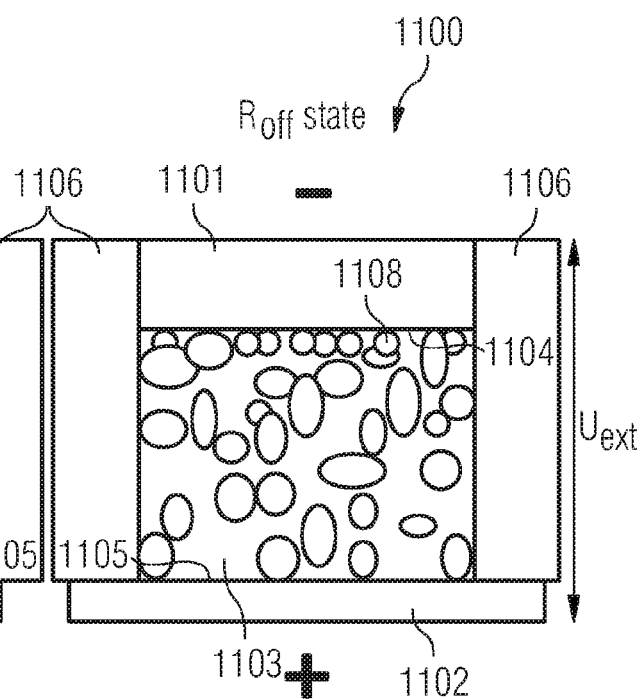
FIG. 11b shows a schematic cross-sectional view of a conductive bridging memory cell set to a second switching state.

As shown in FIG. 11A, a CBRAM cell 1100 includes a first electrode 1101 a second electrode 1102, and a solid electrolyte block (in the following also referred to as ion conductor block) 1103 which includes the active material and which is sandwiched between the first electrode 1101 and the second electrode 1102. This solid electrolyte block 1103 can also be shared between a plurality of memory cells (not shown here). The first electrode 1101 contacts a first surface 1104 of the ion conductor block 1103, the second electrode 1102 contacts a second surface 1105 of the ion conductor block 1103. The ion conductor block 1103 is isolated against its environment by an isolation structure 1106. The first surface 1104 usually is the top surface, the second surface 1105 the bottom surface of the ion conductor 1103. In the same way, the first electrode 1101 generally is the top electrode, and the second electrode 1102 the bottom electrode of the CBRAM cell. One of the first electrode 1101 and the second electrode 1102 is a reactive electrode, the other one an inert electrode. Here, the first electrode 1101 is the reactive electrode, and the second electrode 1102 is the inert electrode. In this example, the first electrode 1101 includes silver (Ag), the ion conductor block 1103 includes silver-doped chalcogenidee material, the second electrode 1102 includes tungsten (W), and the isolation structure 1106 includes $SiO_2$ or $Si_3N_4$. Embodiments of the present invention are however not restricted to these materials. For example, the first electrode 1101 may alternatively or additionally include copper (Cu) or zinc (Zn), and the ion conductor block 1103 may alternatively or additionally include copper-doped chalcogenidee material. Further, the second electrode 1102 may alternatively or additionally include nickel (Ni) or platinum (Pt), iridium (Ir), rhenium (Re), tantalum (Ta), titanium (Ti), ruthenium (Ru), molybdenum (Mo), vanadium (V), conductive oxides, silicides, and nitrides of the aforementioned materials, and can also include alloys of the aforementioned materials. The thickness of the ion conductor 1103 may, for example, range between about 5 nm and about 500 nm. The thickness of the first electrode 1101 may, for example, range between about 10 nm and about 100 nm. The thickness of the second electrode 1102 may, for example, range between about 5 nm and about 500 nm, between about 15 nm to about 150 nm, or between about 25 nm and about 100 nm. It is to be understood that an embodiment of the present invention is not restricted to the above-mentioned materials and thicknesses.

In the context of this description, chalcogenidee material (ion conductor) is to be understood, for example, as any compound containing oxygen, sulphur, selenium, germanium and/or tellurium. In accordance with one embodiment of the invention, the ion conducting material is, for example, a compound, which is made of a chalcogenidee and at least one metal of the group I or group II of the periodic system, for example, arsenic-trisulfide-silver. Alternatively, the chalcogenidee material contains germanium-sulfide ($GeS_x$), germanium-selenide ($GeSe_x$), tungsten oxide ($WO_x$), copper sulfide ($CuS_x$) or the like. The ion conducting material may be a solid state electrolyte. Furthermore, the ion conducting material can be made of a chalcogenidee material containing metal ions, wherein the metal ions can be made of a metal, which is selected from a group consisting of silver, copper and zinc or of a combination or an alloy of these metals.

If a voltage as indicated in FIG. 11A is applied across the ion conductor block 1103, a redox reaction is initiated which drives $Ag^+$ ions out of the first electrode 1101 into the ion conductor block 1103 where they are reduced to Ag, thereby forming Ag rich clusters 1108 within the ion conductor block 1103. If the voltage applied across the ion conductor block 1103 is applied for an enhanced period of time, the size and the number of Ag rich clusters within the ion conductor block 1103 is increased to such an extent that a conductive bridge 1107 between the first electrode 1101 and the second electrode 1102 is formed. In case that a voltage is applied across the ion conductor 1103 as shown in FIG. 11B (inverse voltage compared to the voltage applied in FIG. 11A), a redox reaction is initiated which drives $Ag^+$ ions out of the ion conductor block 1103 into the first electrode 1101 where they are reduced to Ag. As a consequence, the size and the number of Ag rich clusters within the ion conductor block 1103 is reduced, thereby erasing the conductive bridge 1107. After having applied the voltage/inverse voltage, the memory cell 1100 remains within the corresponding defined switching state even if the voltage/inverse voltage has been removed.

In order to determine the current memory status of a CBRAM cell, for example a sensing current is routed through the CBRAM cell. The sensing current experiences a high resistance in case no conductive bridge 1107 exists within the CBRAM cell, and experiences a low resistance in case a conductive bridge 1107 exists within the CBRAM cell. A high resistance may, for example, represent "0", whereas a low resistance represents "1", or vice versa. The memory status detection may also be carried out using sensing voltages. Alternatively, a sensing voltage may be used in order to determine the current memory status of a CBRAM cell.

More generally, the embodiments of the present invention can be applied to arbitrary integrated circuits including resistivity changing memory cells.

According to one embodiment of the invention, the resistivity changing memory cells are phase changing memory cells that include a phase changing material. The phase changing material can be switched between at least two different crystallization states (i.e., the phase changing material may adopt at least two different degrees of crystallization), wherein each crystallization state may be used to represent a memory state. When the number of possible crystallization states is two, the crystallization state having a high degree of crystallization is also referred to as a "crystalline state", whereas the crystallization state having a low degree of crystallization is also referred to as an "amorphous state". Different crystallization states can be distinguished from each other by their differing electrical properties, and in particular by their different resistances. For example, a crystallization state having a high degree of crystallization (ordered atomic structure) generally has a lower resistance than a crystallization state having a low degree of crystallization (disordered atomic structure). For sake of simplicity, it will be assumed in the following that the phase changing material can adopt two crystallization states (an "amorphous state" and a "crystalline state"), however it will be understood that additional intermediate states may also be used.

Phase changing memory cells may change from the amorphous state to the crystalline state (and vice versa) due to temperature changes of the phase changing material. These temperature changes may be caused using different approaches. For example, a current may be driven through the phase changing material (or a voltage may be applied across the phase changing material). Alternatively, a current or a voltage may be fed to a resistive heater which is disposed adjacent to the phase changing material. To determine the memory state of a resistivity changing memory cell, a sensing current may be routed through the phase changing material (or a sensing voltage may be applied across the phase changing material), thereby sensing the resistivity of the resistivity changing memory cell, which represents the memory state of the memory cell.

FIG. 6 illustrates a cross-sectional view of an exemplary phase changing memory cell 600 (active-in-via type). The phase changing memory cell 600 includes a first electrode 602, a phase changing material 604, a second electrode 606, and an insulating material 608. The phase changing material 604 is laterally enclosed by the insulating material 608. To use the phase changing memory cell, a selection device (not shown), such as a transistor, a diode, or another active device, may be coupled to the first electrode 602 or to the second electrode 606 to control the application of a current or a voltage to the phase changing material 604 via the first electrode 602 and/or the second electrode 606. To set the phase changing material 604 to the crystalline state, a current pulse and/or voltage pulse may be applied to the phase changing material 604, wherein the pulse parameters are chosen such that the phase changing material 604 is heated above its crystallization temperature, while keeping the temperature below the melting temperature of the phase changing material 604. To set the phase changing material 604 to the amorphous state, a current pulse and/or voltage pulse may be applied to the phase changing material 604, wherein the pulse parameters are chosen such that the phase changing material 604 is quickly heated above its melting temperature, and is quickly cooled.

The phase changing material 604 may include a variety of materials. According to one embodiment, the phase changing material 604 may include or consist of a chalcogenidee alloy that includes one or more elements from group VI of the periodic table. According to another embodiment, the phase changing material 604 may include or consist of a chalcogenidee compound material, such as GeSbTe, SbTe, GeTe or AgInSbTe. According to a further embodiment, the phase changing material 604 may include or consist of chalcogen free material, such as GeSb, GaSb, InSb, or GeGaInSb. According to still another embodiment, the phase changing material 604 may include or consist of any suitable material including one or more of the elements Ge, Sb, Te, Ga, Bi, Pb, Sn, Si, P, O, As, In, Se, and S.

According to one embodiment, at least one of the first electrode 602 and the second electrode 606 may include or consist of Ti, V, Cr, Zr, Nb, Mo, Hf, Ta, W, or mixtures or alloys thereof. According to another embodiment, at least one of the first electrode 602 and the second electrode 606 may include or consist of Ti, V, Cr, Zr, Nb, Mo, Hf, Ta, W and two or more elements selected from the group consisting of B, C, N, O, Al, Si, P, S, and/or mixtures and alloys thereof. Examples of such materials include TiCN, TIAlN, TiSiN, W—$Al_2O_3$ and Cr—$Al_2O_3$.

Figure 7:
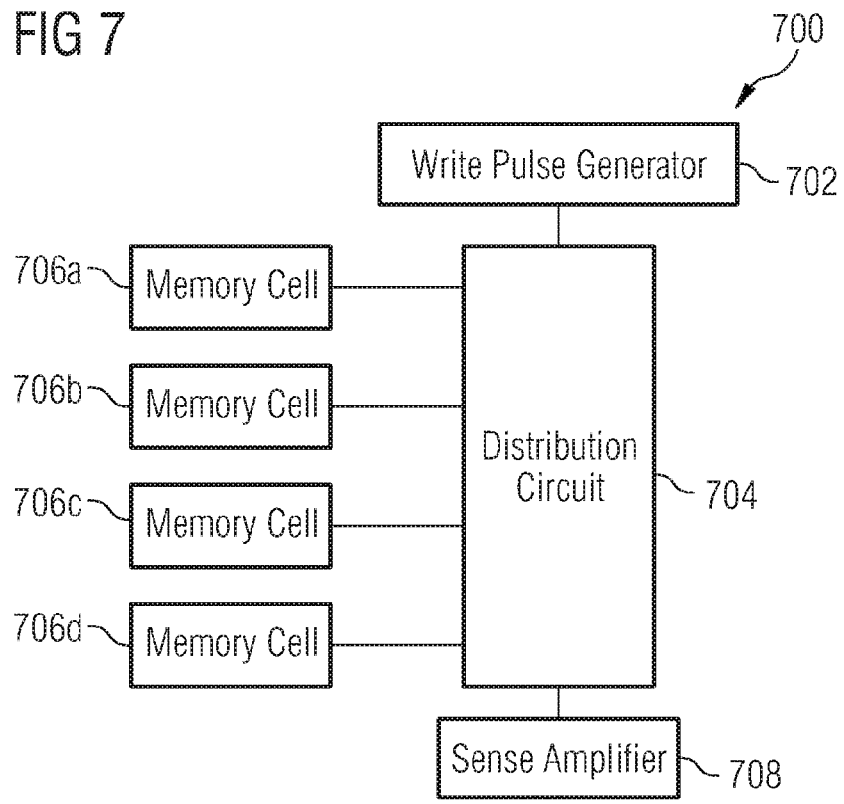
FIG. 7 shows a schematic drawing of an integrated circuit employing resistivity changing memory cells.

FIG. 7 illustrates a block diagram of a memory device 700 including a write pulse generator 702, a distribution circuit 704, phase changing memory cells 706a, 706b, 706c, 706d (for example, phase changing memory cells 600 as shown in FIG. 6), and a sense amplifier 708. According to one embodiment, the write pulse generator 702 generates current pulses or voltage pulses that are supplied to the phase changing memory cells 706a, 706b, 706c, 706d via the distribution circuit 704, thereby programming the memory states of the phase changing memory cells 706a, 706b, 706c, 706d. According to one embodiment, the distribution circuit 704 includes a plurality of transistors that supply direct current pulses or direct voltage pulses to the phase changing memory cells 706a, 706b, 706c, 706d or to heaters being disposed adjacent to the phase changing memory cells 706a, 706b, 706c, 706d.

As already indicated, the phase changing material of the phase changing memory cells 706a, 706b, 706c, 706d may be changed from the amorphous state to the crystalline state (or vice versa) under the influence of a temperature change. More generally, the phase changing material may be changed from a first degree of crystallization to a second degree of crystallization (or vice versa) under the influence of a temperature change. For example, a bit value "0" may be assigned to the first (low) degree of crystallization, and a bit value "1" may be assigned to the second (high) degree of crystallization. Since different degrees of crystallization imply different electrical resistances, the sense amplifier 708 is capable of determining the memory state of one of the phase changing memory cells 706a, 706b, 706c, or 706d in dependence on the resistance of the phase changing material.

To achieve high memory densities, the phase changing memory cells 706a, 706b, 706c, 706d may be capable of storing multiple bits of data, i.e., the phase changing material may be programmed to more than two resistance values. For example, if a phase changing memory cell 706a, 706b, 706c, 706d is programmed to one of three possible resistance levels, 1.5 bits of data per memory cell can be stored. If the phase changing memory cell is programmed to one of four possible resistance levels, two bits of data per memory cell can be stored, and so on.

The embodiment shown in FIG. 7 may also be applied in a similar manner to other types of resistivity changing memory cells like programmable metallization cells (PMCs), magento-resistive memory cells (e.g., MRAMs), organic memory cells (e.g., ORAMs), or transition oxide memory cells (TMOs).

Another type of resistivity changing memory cell may be formed using carbon as a resistivity changing material. Generally, amorphous carbon that is rich is $sp^3$-hybridized carbon (i.e., tetrahedrally bonded carbon) has a high resistivity, while amorphous carbon that is rich in $sp^2$-hybridized carbon (i.e., trigonally bonded carbon) has a low resistivity. This difference in resistivity can be used in a resistivity changing memory cell.

In one embodiment, a carbon memory cell may be formed in a manner similar to that described above with reference to phase changing memory cells. A temperature-induced change between an $sp^3$-rich state and an $sp^2$-rich state may be used to change the resistivity of an amorphous carbon material. These differing resistivities may be used to represent different memory states. For example, a high resistance $sp^3$-rich state can be used to represent a "0", and a low resistance $sp^2$-rich state can be used to represent a "1". It will be understood that intermediate resistance states may be used to represent multiple bits, as discussed above.

Generally, in this type of carbon memory cell, application of a first temperature causes a change of high resistivity $sp^3$-rich amorphous carbon to relatively low resistivity $sp^2$-rich amorphous carbon. This conversion can be reversed by application of a second temperature, which is typically higher than the first temperature. As discussed above, these temperatures may be provided, for example, by applying a current and/or voltage pulse to the carbon material. Alternatively, the temperatures can be provided by using a resistive heater that is disposed adjacent to the carbon material.

Another way in which resistivity changes in amorphous carbon can be used to store information is by field-strength induced growth of a conductive path in an insulating amorphous carbon film. For example, applying voltage or current pulses may cause the formation of a conductive $sp^2$ filament in insulating $sp^3$-rich amorphous carbon. The operation of this type of resistive carbon memory is illustrated in FIGS. 8A and 8B.

Figure 8A:
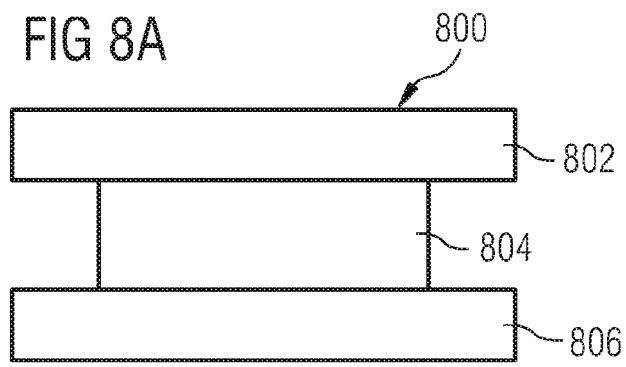
FIG. 8a shows a schematic cross-sectional view of a carbon memory cell set to a first memory state.
Figure 8B:
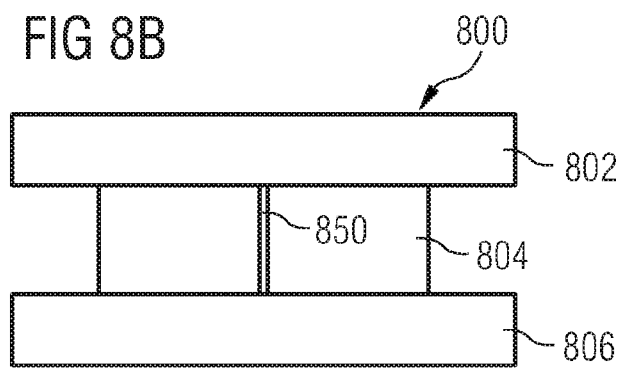
FIG. 8b shows a schematic cross-sectional view of a carbon memory cell set to a second memory state.

FIG. 8A shows a carbon memory cell 800 that includes a top contact 802, a carbon storage layer 804 including an insulating amorphous carbon material rich in $sp^3$-hybridized carbon atoms, and a bottom contact 806. As shown in FIG. 8B, by forcing a current (or voltage) through the carbon storage layer 804, an $sp^2$ filament 850 can be formed in the $sp^3$-rich carbon storage layer 804, changing the resistivity of the memory cell. Application of a current (or voltage) pulse with higher energy (or, in some embodiments, reversed polarity) may destroy the $sp^2$ filament 850, increasing the resistance of the carbon storage layer 804. As discussed above, these changes in the resistance of the carbon storage layer 804 can be used to store information, with, for example, a high resistance state representing a "0" and a low resistance state representing a "1". Additionally, in some embodiments, intermediate degrees of filament formation or formation of multiple filaments in the $sp^3$-rich carbon film may be used to provide multiple varying resistivity levels, which may be used to represent multiple bits of information in a carbon memory cell. In some embodiments, alternating layers of $sp^3$-rich carbon and $sp^2$-rich carbon may be used to enhance the formation of conductive filaments through the $sp^3$-rich layers, reducing the current and/or voltage that may be used to write a value to this type of carbon memory.

Resistivity changing memory cells, such as the phase changing memory cells and carbon memory cells described above, may include a transistor, diode, or other active component for selecting the memory cell. FIG. 9A shows a schematic representation of such a memory cell that uses a resistivity changing memory element. The memory cell 900 includes a select transistor 902 and a resistivity changing memory element 904. The select transistor 902 includes a source 906 that is connected to a bit line 908, a drain 910 that is connected to the memory element 904, and a gate 912 that is connected to a word line 914. The resistivity changing memory element 904 also is connected to a common line 916, which may be connected to ground, or to other circuitry, such as circuitry (not shown) for determining the resistance of the memory cell 900, for use in reading. Alternatively, in some configurations, circuitry (not shown) for determining the state of the memory cell 900 during reading may be connected to the bit line 908. It should be noted that as used herein the terms connected and coupled are intended to include both direct and indirect connection and coupling, respectively.

To write to the memory cell 900, the word line 914 is used to select the memory cell 900, and a current (or voltage) pulse on the bit line 908 is applied to the resistivity changing memory element 904, changing the resistance of the resistivity changing memory element 904. Similarly, when reading the memory cell 900, the word line 914 is used to select the cell 900, and the bit line 908 is used to apply a reading voltage (or current) across the resistivity changing memory element 904 to measure the resistance of the resistivity changing memory element 904.

The memory cell 900 may be referred to as a 1T1J cell, because it uses one transistor, and one memory junction (the resistivity changing memory element 904). Typically, a memory device will include an array of many such cells. It will be understood that other configurations for a 1T1J memory cell, or configurations other than a 1T1J configuration may be used with a resistivity changing memory element. For example, in FIG. 9B, an alternative arrangement for a 1T1J memory cell 950 is shown, in which a select transistor 952 and a resistivity changing memory element 954 have been repositioned with respect to the configuration shown in FIG. 9A. In this alternative configuration, the resistivity changing memory element 954 is connected to a bit line 958, and to a source 956 of the select transistor 952. A drain 960 of the select transistor 952 is connected to a common line 966, which may be connected to ground, or to other circuitry (not shown), as discussed above. A gate 962 of the select transistor 952 is controlled by a word line 964.

As shown in FIGS. 10A and 10B, in some embodiments, integrated circuits such as those described herein may be used in modules. In FIG. 10A, a memory module 1000 is shown, on which one or more integrated circuits 1004 are arranged on a substrate 1002. The integrated circuits 1004 may include numerous memory cells. The memory module 1000 may also include one or more electronic devices 1006, which may include memory, processing circuitry, control circuitry, addressing circuitry, bus interconnection circuitry, or other circuitry or electronic devices that may be combined on a module with memory devices, such as the integrated circuits 1004. Additionally, the memory module 1000 includes multiple electrical connections 1008, which may be used to connect the memory module 1000 to other electronic components, including other modules.

As shown in FIG. 10B, in some embodiments, these modules may be stackable, to form a stack 1050. For example, a stackable memory module 1052 may contain one or more integrated circuits 1056, arranged on a stackable substrate 1054. The stackable memory module 1052 may also include one or more electronic devices 1058, which may include memory, processing circuitry, control circuitry, addressing circuitry, bus interconnection circuitry, or other circuitry or electronic devices that may be combined on a module with a memory device, such as the integrated circuits 1056. Electrical connections 1060 are used to connect the stackable memory module 1052 with other modules in the stack 1050, or with other electronic devices. Other modules in the stack 1050 may include additional stackable memory modules, similar to the stackable memory module 1052 described above, or other types of stackable modules, such as stackable processing modules, control modules, communication modules, or other modules containing electronic components.

In the following description, further features of exemplary embodiments of the present invention will be explained.

According to one embodiment of the present invention, a temperature sensor is provided which is capable of providing the accumulated temperature budget to which the temperature sensor had been exposed in an electronically readable form. The temperature sensor changes its electrical resistance in dependence on the temperature, wherein the highest temperature as well as the duration of the temperature is detectable as a resistance value. The temperature sensor may be integrated into typical semiconductor manufacturing processes. Further, the temperature sensor is scalable, i.e., it is possible to manufacture an on-chip temperature sensor or a discrete temperature sensor.

According to one embodiment of the present invention, the temperature sensor may be applied to the field of memory chip products or logic chip products. According to one embodiment, the present invention is applied to "known good die" products. In this case, the manufacturer is capable of determining the temperature applied on a chip (for example, by soldering, bonding, temperature of the liquid molding mass, etc.), wherein the determination of the applied temperature may, for example, be carried out by applying a test mode and by carrying out an external or internal test. According to one embodiment of the present invention, the temperature sensor may be reset by applying a suitable voltage or current. From the data thus determined it can be derived whether the temperature budget applied has been kept within a specification range of the chip or not.

According to one embodiment of the present invention, the temperature sensor is capable of measuring the accumulative temperature over a long period of time. Further, the temperature sensor may have the capability to be reset. According to one embodiment of the present invention, the temperature sensor includes a metal (inert cathode, for example, Au, W, Ti, TiN, Pt, Ta, TaN, C, etc.), on which an electric non-conductive material is deposited which is nanoporous. A metal (reactive anode, e.g., silver, copper, or aluminum) is deposited on the nanoporous material.

According to one embodiment of the present invention, the temperature sensor is based on the fact that for example the silver diffusion coefficient is a function of the temperature in several nanoporous materials. The silver which diffuses into the nanoporous matrix reduces the resistance between metal electrodes between which the nanoporous material is sandwiched, wherein the resistance indicates the temperature budget to which the temperature sensor (and thus an integrated circuit including the temperature sensor) has been subjected since the last reset of the temperature sensor. In this case, the anode forms the silver reservoir from which the silver gradient over the nanoporous matrix starts to form. Porous matrix chalcogenide glasses, dielectrics, e.g., carbon doped $SiO_2$, and all other insulating materials that can form a nanoporous matrix may be used. The temperature sensing range can be influenced/set by choosing the suitable nanoporous material and the suitable way of forming the nanoporous material as well as by choosing the kind of diffusion material (e.g., metal atoms) and the concentration thereof.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A temperature sensor, comprising
   a first electrode,
   a second electrode,
   a nanoporous material disposed between the first electrode and the second electrode, and
   a diffusion material which is located outside the nanoporous material and which is capable of diffusing into the nanoporous material,
   wherein the amount of diffusion material diffusing into the nanoporous material is dependent on the temperature to which the temperature sensor is exposed, and
   wherein the amount of diffusion material diffusing into the nanoporous material depends on a duration of a temperature treatment to which the temperature sensor is subjected,
   wherein the resistance of the nanoporous material is dependent on the amount of diffusion material in the nanoporous material,
   wherein the nanoporous material is configured such that the resistance can be reset to the original value by applying a suitable current or voltage, and
   wherein the temperature sensor is configured to determine temperature treatment data based on a determined amount of diffusion material diffused into the nanoporous material.

2. The temperature sensor according to claim 1, wherein the amount of diffusion material diffusing into the nanoporous material depends on a highest temperature of a temperature treatment to which the temperature sensor is subjected.

3. The temperature sensor according to claim 1, wherein the amount of diffusion material diffusing into the nanoporous material is proportional to an accumulative temperature applied to the temperature sensor.

4. The temperature sensor according to claim 1, wherein the first electrode is a reactive electrode, and the second electrode is an inert electrode.

5. The temperature sensor according to claim 4, wherein the diffusion material is material located within the reactive electrode.

6. The temperature sensor according to claim 4, wherein the reactive electrode is a metal layer having a high diffusion coefficient.

7. The temperature sensor according to claim 4, wherein the reactive electrode comprises silver, copper, or aluminium.

8. The temperature sensor according to claim 4, wherein the inert electrode comprises gold, tungsten, titanium, titanium nitride, platinum, tantalum, tantalum nitride, or carbon.

9. The temperature sensor according to claim 1, wherein the diffusion material comprises conductive material, and the nanoporous material comprises or consists of insulating material.

10. The temperature sensor according to claim 1, wherein the nanoporous material comprises chalcogenide glass.

11. The temperature sensor according to claim 1, wherein the nanoporous material comprises dielectric material.

12. The temperature sensor according to claim 1, wherein the nanoporous material comprises carbon doped SiO2.

13. The temperature sensor according to claim 1, wherein the nanoporous material is arranged as a nanoporous material layer, and the first electrode is arranged as a first electrode layer, wherein the nanoporous material layer has the same lateral dimensions as that of the first electrode layer.

14. The temperature sensor according to claim 1, wherein the nanoporous material is disposed in a plug formed within an isolation layer, wherein the isolation layer is disposed between the first electrode layer and the second electrode layer, and wherein the plug connects the first electrode layer with the second electrode layer.

15. A method of collecting temperature treatment data, comprising:
   subjecting a composite structure comprising a nanoporous material layer and a diffusion material layer disposed on or above the nanoporous material layer to a temperature treatment such that diffusion material diffuses out of the diffusion material layer into the nanoporous material layer,
   determining the amount of diffusion material diffused into the nanoporous material layer, and
   determining temperature treatment data in dependence on the amount of diffusion material determined, and
   resetting a resistance to an original value by applying a suitable current or voltage to the nanoporous material.

16. The method according to claim 15, wherein the temperature treatment data comprises accumulative temperature data indicating the course of temperature to which the composite structure had been subjected.

17. The method according to claim 15, wherein the temperature treatment data is determined based on the strength of a resistance change of the nanoporous material caused by a concentration change of the diffusion material within the nanoporous material.

* * * * *